United States Patent
Bandi et al.

(10) Patent No.: US 11,405,763 B1
(45) Date of Patent: Aug. 2, 2022

(54) V2X ROAD USAGE CHARGING

(71) Applicant: FORD GLOBAL TECHNOLOGIES, LLC, Dearborn, MI (US)

(72) Inventors: Krishna Bandi, Farmington Hills, MI (US); Sathyanarayana Chary Palakonda, Northville, MI (US); Samer Ibrahim, Dearborn, MI (US); Brennan Hamilton, Birmingham, MI (US); Colette Knopp, South Lyon, MI (US); Basavaraj Tonshal, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/218,714

(22) Filed: Mar. 31, 2021

(51) Int. Cl.
| | |
|---|---|
| H04W 4/44 | (2018.01) |
| G07B 15/06 | (2011.01) |
| G06Q 20/32 | (2012.01) |
| G07B 15/02 | (2011.01) |
| G08G 1/0967 | (2006.01) |
| G06Q 30/02 | (2012.01) |
| G07C 5/00 | (2006.01) |

(52) U.S. Cl.
CPC ............ *H04W 4/44* (2018.02); *G06Q 20/325* (2013.01); *G06Q 30/0284* (2013.01); *G07B 15/02* (2013.01); *G07B 15/063* (2013.01); *G07C 5/008* (2013.01); *G08G 1/096783* (2013.01); *G06Q 2240/00* (2013.01)

(58) Field of Classification Search
None
See application file for complete search history.

(56) References Cited

U.S. PATENT DOCUMENTS

| | | | |
|---|---|---|---|
| 4,338,587 A * | 7/1982 | Chiappetti | G07B 15/04 340/505 |
| 5,310,999 A * | 5/1994 | Claus | G07B 15/063 705/13 |
| 5,694,322 A | 12/1997 | Westerlage et al. | |
| 8,587,454 B1 * | 11/2013 | Dearworth | G07B 15/063 340/5.1 |
| 9,691,188 B2 | 6/2017 | Breed et al. | |
| 2015/0021389 A1 | 1/2015 | Gravelle | |
| 2019/0318398 A1 * | 10/2019 | Borras | H04W 4/46 |
| 2020/0160478 A1 * | 5/2020 | Ramot | G01C 21/343 |
| 2021/0142585 A1 * | 5/2021 | Murray | H04W 4/06 |
| 2021/0183175 A1 * | 6/2021 | Dunger | G07C 5/0875 |
| 2021/0339650 A1 * | 11/2021 | Hashimoto | B60L 15/20 |

FOREIGN PATENT DOCUMENTS

| | | | |
|---|---|---|---|
| CA | 2867173 A1 * | 4/2016 | |
| JP | 2014016654 A * | 1/2014 | G01C 21/3697 |

OTHER PUBLICATIONS

Kirk, Robert S. et al., Mileage-Based Road User Charges, Congressional Research Service, Jun. 22, 2016.

* cited by examiner

*Primary Examiner* — Muhammad Adnan
(74) *Attorney, Agent, or Firm* — Michael J. Spenner; Brooks Kushman P.C.

(57) ABSTRACT

A toll advertisement message is received, via a V2X transceiver of a vehicle, defining a metered zone in which tolls are charged. Input data indicative of a current position of the vehicle with respect to the metered zone is determined. A state machine is utilized to determine tolled roadway usage of the vehicle according to the metered zone and the current position. A toll usage message indicative of the tolled roadway usage is provided via the V2X transceiver.

13 Claims, 10 Drawing Sheets

V2X ROAD USAGE CHARGING

TECHNICAL FIELD

Aspects of the present disclosure generally relate to charging of vehicles for road usage via cellular vehicle-to-everything (V2X) communication.

BACKGROUND

V2X Tolling may refer to electronic fee collection (EFC) toll charging, supported by electronic equipment on-board of a vehicle configured for V2X communication. These V2X communications may include the exchange of information between various infrastructure elements.

SUMMARY

In one or more illustrative examples, a vehicle for smart tolling is provided. The vehicle includes a V2X transceiver, a memory maintaining a smart tolling application implementing a state machine, and a processor programmed to execute the smart tolling application to perform operations. The operations include to receive, via the V2X transceiver, a toll advertisement message defining a metered zone in which tolls are charged, determine input data indicative of a current position of the vehicle with respect to the metered zone, utilize the state machine to determine tolled roadway usage of the vehicle according to the metered zone and the current position, and provide, via the V2X transceiver, a toll usage message indicative of the tolled roadway usage.

In one or more illustrative examples, a method for smart tolling is provided. A toll advertisement message is received, via a V2X transceiver of a vehicle, defining a metered zone in which tolls are charged. Input data indicative of a current position of the vehicle with respect to the metered zone is determined. A state machine is utilized to determine tolled roadway usage of the vehicle according to the metered zone and the current position. A toll usage message indicative of the tolled roadway usage is provided via the V2X transceiver.

In one or more illustrative examples, a non-transitory computer-readable medium includes instructions for smart tolling that, when executing by a processor of a vehicle, cause the vehicle to perform operations including to receive, via a V2X transceiver of a vehicle, a toll advertisement message defining a metered zone in which tolls are charged; determine input data indicative of a current position of the vehicle with respect to the metered zone; utilize a state machine to determine tolled roadway usage of the vehicle according to the metered zone and the current position; and provide, via the V2X transceiver, a toll usage message indicative of the tolled roadway usage.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

With the increasingly higher costs to maintain roads and manage traffic and congestion, it may be desirable to improve the accuracy of measuring road usage by vehicles. Electronic tolling systems such as radio frequency identification (RFID), on-board diagnostic (OBD)-II devices and gantry-based technology platforms may be incapable of providing precise vehicle usage for road usage charging, real time information, notifications, and alerts about vehicle road usage in comfortable advance to the vehicle-customer driving into tolled areas, as well as detailed in-vehicle human machine interface (HMI) screens. Such systems may also lack access to additional in-vehicle information, such as precise vehicle odometer miles, vehicle occupancy, vehicle make, vehicle model, vehicle type, vehicle dimensions, fuel usage, license plate information, trailer license plate information, etc. Such systems may also be unable to sharing or broadcast such detailed vehicle usage information indicative of the road usage to the road operators.

An improved vehicle tolling system may be integrated into a vehicle to have access to this and other additional information. The vehicle-integrated solution may be further able to identify additional aspects, such as road level usage by the vehicle, proper lane tracking/identification by the vehicle, various toll road and lane geometries or topologies, determination of the vehicle precision within the road and lane, determination of the lane straddling scenarios, as well as conveying information to the driver with respect to the road usage.

Figure 1:
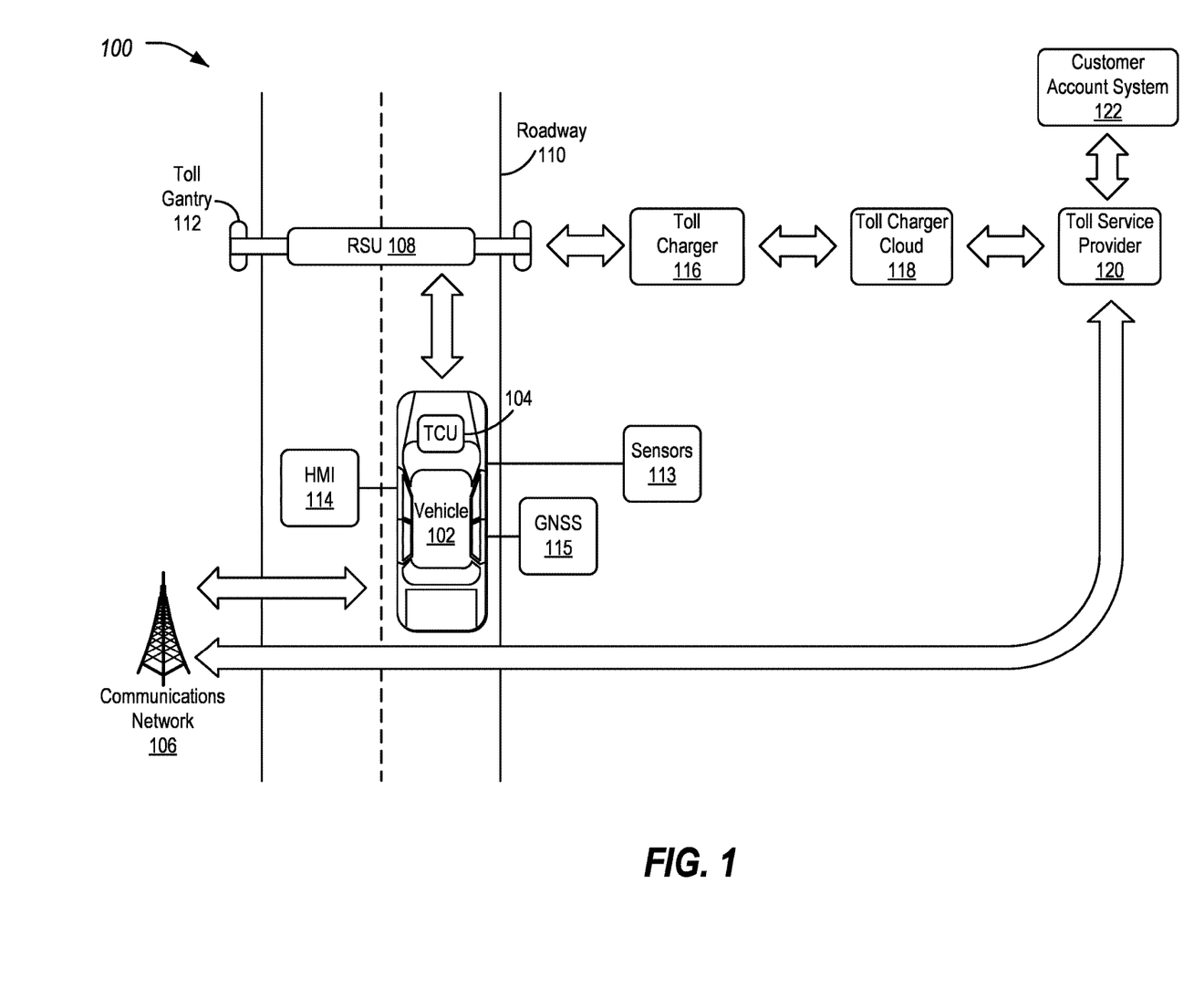
FIG. 1 illustrates an example system for the performance of V2X tolling transactions in accordance with a V2X road usage charging approach.

FIG. 1 illustrates an example system 100 for the performance of V2X tolling transactions. As shown, the system 100 includes a wireless-enabled vehicle 102 configured to travel along a roadway 110. The vehicle 102 includes a telematics control unit (TCU) 104 and a HMI 114. The system 100 also includes a toll gantry 112 or other toll installation that includes a road-side unit (RSU) 108. The RSU 108 communicates with a toll charger server 116 over a secure channel (such as a wired connection), which in turn communicates with a toll pay center 118. The toll pay center 118 also communicates with a toll agency hub 120 and a customer account system 122. Using the TCU 104, the vehicle 102 communicates with the RSU 108 over a broadcast peer-to-peer protocol (such as PC5), and with a communications network 106 over a network protocol, which allows the vehicle 102 to communicate with the customer account system 122, for example. It should be noted that the system 100 shown in FIG. 1 is merely an example, and systems having more, fewer, and different arrangements of elements may be used. For instance, one or more of the RSU 108, toll charger server 116, toll pay center 118, and toll agency hub 120 may be combined into a single device. Moreover, while one vehicle 102 along one roadway 110 is shown, it is contemplated that systems 100 would include many vehicles 102 and roadways 110 to traverse.

The vehicles 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The TCU 104 may be configured to provide telematics services to the vehicle 102. These services may include, as some non-limiting possibilities, navigation, turn-by-turn directions, vehicle health reports, local business search, accident reporting, and hands-free calling. The TCU 104 may accordingly be configured to communicate over various protocols, such as with a communications network 106 over a network protocol (such as Uu). The TCU 104 may, additionally, be configured to communicate over a broadcast peer-to-peer protocol (such as PC5), to facilitate V2X communications with devices such as the RSU 108. It should be noted that these protocols are merely examples, and different peer-to-peer and/or cellular technologies may be used.

The communications network 106 may provide communications services, such as packet-switched network services (e.g., Internet access, voice over Internet Protocol (VoIP) communication services), to devices connected to the communications network 106. An example of a communications network 106 is a cellular telephone network. For instance, the TCU 104 may access the cellular network via connection to one or more cellular towers. To facilitate the communications over the communications network 106, the TCU 104 may be associated with unique device identifiers (e.g., mobile device numbers (MDNs), Internet protocol (IP) addresses, etc.) to identify the communications of the TCU 104 on the communications network 106 as being associated with the vehicle 102.

The RSU 108 may be a device with processing capabilities and networking capabilities, and may be designed to be placed in proximity of a roadway 110 for use in communicating with vehicles 102. In an example, the RSU 108 may include hardware configured to communicate over the broadcast peer-to-peer protocol (such as PC5), to facilitate V2X communications with the vehicles 102. The RSU 108 may also have wired or wireless backhaul capability to allow for communication with other elements of the communications network 106, such as the toll charger server 116.

The toll gantry 112 may be framework installed across the roadway 110. The toll gantry 112 may serve as a location to mount hardware to give the hardware a clear view of the roadway 110. In an example, the RSU 108 may be mounted to the toll gantry 112. It should be noted that, in other examples, the RSU 108 may be located along the ground adjacent to the roadway 110 and the toll gantry 112 may be omitted.

The vehicle sensors 113 may include various vehicle 102 hardware configured to provide information with respect to the surroundings of the vehicle 102. Example vehicle sensor 113 types may include cameras, radar sensors, lidar sensors, and the like. The visual, radar, lidar, etc. information captured from these sensors may be used for vehicle 102 features, such as advanced driver-assistance systems (ADAS), and/or autonomous driving systems. This information may also be used to aid in the determination of vehicle 102 location for use in tolling.

The HMI 114 may include various output devices configured to provide information to users, as well as input devices configured to receive information from users. Output devices may include, as some examples, display screens, touch screens, projectors, lights, speakers, buzzers, and haptic feedback sensors. Input devices may include, as some examples, touch screens, keyboards, buttons, knobs, and microphones, as some possibilities.

A GNSS 115 controller may be utilized by the vehicle 102 to provide autonomous geo-spatial positioning for the vehicle 102. As some examples, the GNSS 115 controller may allow the vehicle 102 to determine its position using one or more satellite navigation systems, such as global positioning system (GPS), GLONASS, Galileo, Beidou and/or others.

The toll charger server 116 is a networked computing device configured to perform operations in support of the functionality of the RSU 108. In an example, the toll charger server 116 may be in communication with the RSU 108 and may be programmed to operate as a gateway between the RSU 108 and the toll pay center 118. The toll charger server 116 may be responsible for managing operations between the broadcast nature of the RSU 108 operations and the remainder of the system 100. These operations may include, for example, verification of messages received from vehicles 102 by the RSU 108, certificate verification and identification, and communication with the toll pay center 118 to perform further operations over a secure line. In many examples, each RSU 108 may be supported by its own corresponding toll charger server 116. However, in other examples, a single toll charger server 116 may be configured to handle multiple RSUs 108, such as a set of RSUs 108 covering operation of the roadway 110.

The toll pay center 118 is a networked computing device also configured to perform operations in support of the functionality of the system 100. In an example, the toll pay center 118 may be programmed to perform operations in support of the payment aspects for use of the roadway 110 by the vehicle 102. In some examples, the system 100 may include different toll pay centers 118, where each toll pay center 118 is configured to handle payments for those vehicles 102 having accounts with the toll pay center 118. As one possibility, different vehicle 102 manufacturers may each maintain their own toll pay center 118. As another possibility, vehicles 102 may subscribe to the use of various third-party toll pay centers 118.

The toll agency hub 120 is a networked computing device also configured to perform operations in support of the functionality of the system 100. The toll agency hub 120 may be configured to perform operations such as providing cost information to the various toll pay centers 118 with respect to the costs for usage of the roadway 110. For instance, the toll agency hub 120 may provide a toll schedule indicative of the costs of traversing the roadway 110, including costs for usage of different lanes (e.g., express, carpool, regular, etc.), usage for different classes of vehicles 102 (e.g., passenger cars, semi-trucks, etc.), usage for different times of day, and usage for high traffic vs low traffic situations. The toll agency hub 120 may also be configured to perform payment reconciliation operations, reporting functions, and may also provide information regarding vehicles 102 that are observed on the roadway 110 that may not have paid (e.g., as identified according to wireless transmissions of basic safety messages (BSMs), pictures from cameras, etc.).

The customer account system 122 is a networked computing device also configured to perform operations in support of the functionality of the system 100. Using the customer account system 122 a user may set up a payment account, be charged by the toll charger server 116 for use of the roadway 110, and request and receive toll receipts with respect to usage of the roadway 110. Such payment transactions require the exchange of personally identifiable information (PII) with toll authorities over the air.

Figure 2:
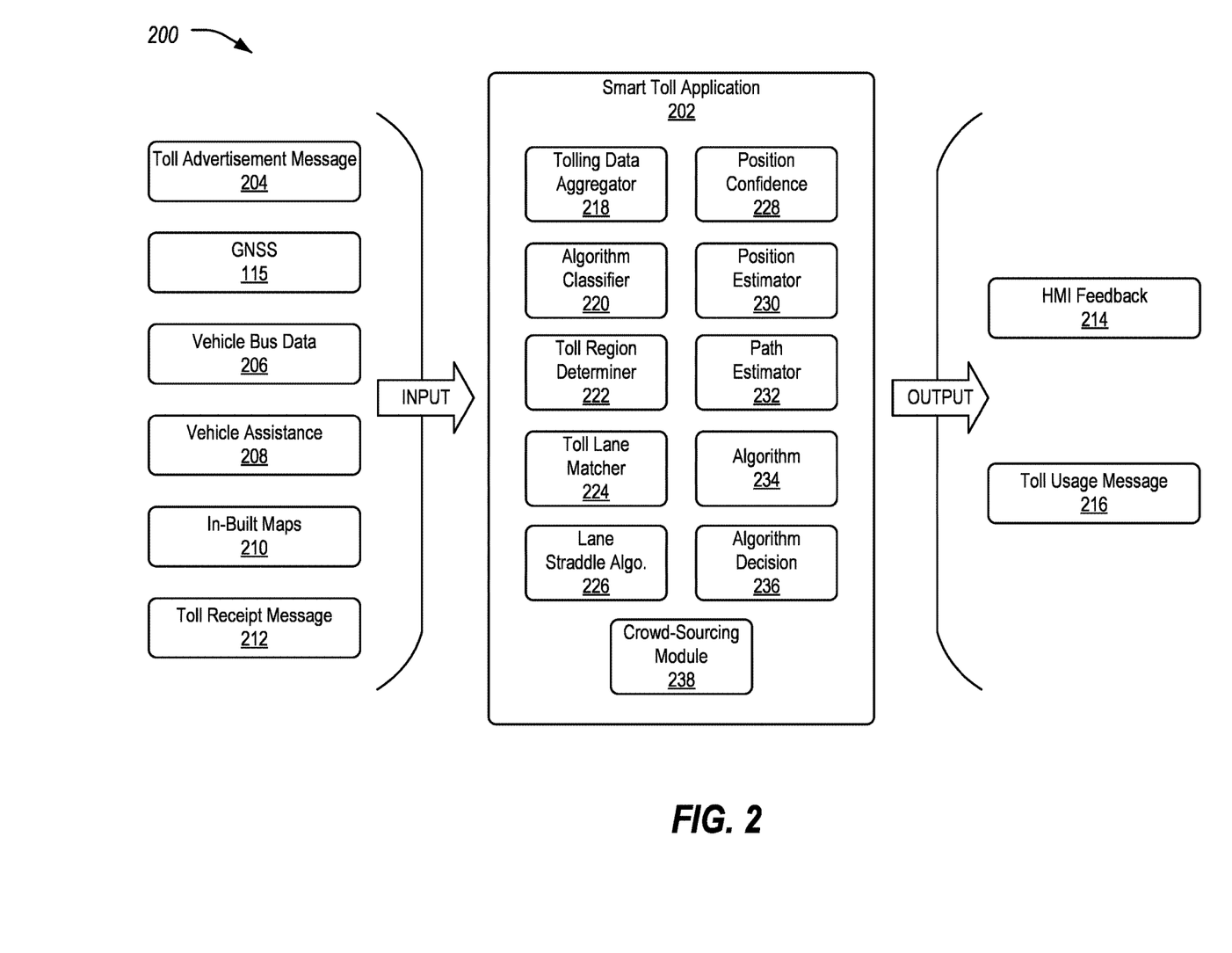
FIG. 2 illustrates an example of aspects of a smart toll application that is executed by the vehicle.

FIG. 2 illustrates an example 200 of aspects of a smart toll application (STA) 202 that is executed by the vehicle 102. With reference to FIG. 2, and with continuing reference to FIG. 1, the STA 202 may be programmed to allow the vehicle 102 to perform various smart tolling operations discussed in detail herein. In an example, the STA 202 may be executed by one or more processors of the TCU 104.

Tolling operations may be performed using the elements of the tolling system 100. For instance, the toll agency hub 120 may send a toll rate schedule to the toll charger server 116. This toll rate table may include information that may be used to allow a vehicle 102 to understand the charges that may be incurred to traverse the roadway 110. In a simple example, the toll rate schedule may indicate that the cost to traverse the roadway 110 is a fixed amount. However, in many examples, the cost to traverse the roadway 110 may vary according to various factors. For instance, travel in a first lane may incur a first charge, while travel in another lane may incur a second, different, charge. In another example, the cost may vary based on the number of occupants of the vehicle 102. In yet a further example, the cost may vary based on the type of vehicle 102 (e.g., a semitruck may incur a greater charge than a passenger car). In an even further example, costs may vary based on other factors, such as amount of traffic, time of day, day of week, and/or weather.

The toll charger server 116 may update rate details of the TAM 204. In an example, the toll charger server 116 receives the toll rate schedule, identifies current rates, and updates rate information at the toll charger server 116. This rate information may be cached at the toll charger server 116 and sent to the RSU 108. The RSU 108 may broadcast the rate information as well as other information in a TAM 204 message. This broadcast may be a periodic broadcast, such as a rebroadcast of the TAM 204 every 100 milliseconds.

The TAM 204 may include other information such as a layer type, a layer identifier, an identifier of the toll charger server 116, and an identifier of the toll pay center 118. The layer type may be a data element used to uniquely identify a type of information to be found in a layer of a geographic map fragment such as an intersection. The layer identifier may correspondingly be an identifier of map information. The identifier may be a globally-unique identifiers (GUID), to allow the toll pay centers 118 to be uniquely identified by the system 100.

The TAM 204 may also include map information indicative of the layout of the roadway 110, such as an intersection geometry list and a road segment list. The road segment list include various properties of the roadway, including lane description, high occupancy status, and so on. This information may include, for instance, indications of the layout of the lanes of the roadway 110, which may be used to allow vehicles 102 to identify when a tolled area is approached, as well as in which lane the vehicle 102 is traveling. Further aspects of map data and other details of message elements described herein are further defined in the J2735 standard Dedicated Short Range Communications (DSRC) Message Set Dictionary, published by the Society of Automotive Engineers (SAE) International, the standard being incorporated herein by reference in its entirety.

The TAM 204 may also include other information such as a list of data parameters. This may include, for instance, other information that may be relevant for tolling that does not fit into the other categories of information, such as special instructions for use of the toll roadway 110. The TAM 204 may also include a restrictions list, which may include information regarding limits to access to the roadway 110, such as weight limits, or restrictions against certain classes of vehicles 102 (e.g., no semitrucks allowed).

The TCU 104 of the vehicle 102 may receive the TAM broadcast by the RSU 108. The vehicle 102 may logs entry into the roadway 110. For instance, responsive to the geographic coordinates of the vehicle 102 matching one of the lanes of the roadway 110, the TCU 104 may identify that the vehicle 102 is entering a specific lane of the roadway 110. Knowing the lane of entry, the TCU 104 may then calculate the charge to be incurred by the vehicle 102. The TCU 104 may also generate a toll usage message (TUM) 216.

The TUM 216 includes various information provided by vehicles 102 to RSUs 108 that indicates usage of the roadway 110 by the vehicle 102. This information may include fields such as a message count that indicates a unique number of the TUM 216 for the transaction. The message count may be used to help in identifying if any packet loss has occurred. The TUM 216 may also include a unique random identifier that may be used as a temporary account identifier to track the transaction of messaging between the vehicle 102 and the broadcast message interface of the RSU 108, while preserving relative anonymity of the vehicle 102.

The TUM 216 may also include information about the vehicle 102 entry to the toll area. For instance, the TUM 216 may include a timestamp the time when the TUM 216 was created, latitude, longitude, and elevation of the vehicle 102, positional accuracy of the latitude, longitude, and elevation, speed of the vehicle 102, and heading of the vehicle 102. The TUM 216 may also include other information, such as type of the vehicle 102, an identifier of the toll charger server 116, and an identifier of the toll pay center 118. The identifiers may be GUIDs, to allow the toll charger servers 116 and toll pay centers 118 to be uniquely identified. The TUM 216 may also include an intersection identifier of the intersection through which the vehicle 102 entered the roadway 110, where the intersection identifier was received by the vehicle 102 in the TAM 204 (e.g., via the intersection geometry list and/or road segment list). The TUM 216 may also include a charge amount for the travel in the tolled area as determined by the vehicle 102 using the information in the TAM 204. Other information may also be included in the TUM 216, such as the distance traveled by the vehicle 102, a number of passengers in the vehicle 102, and a license plate number or other identifier of the vehicle 102.

The TCU 104 may update the HMI 114 to cause the HMI 114 to display a message indicating that the vehicle 102 entered the toll zone. The HMI 114 may further indicate that the vehicle 102 will be charged the amount indicated for the lane that the vehicle 102 is in.

The TCU 104 may send the TUM 216 to the RSU 108. In one example, the TUM may be encoded with a key and/or signed using a certificate, and the RSU 108 may utilize a key or other information to decrypt and/or confirm the sender of the TUM 216 as being the TCU 104. The RSU 108 may forward the TUM 216 to the toll charger server 116. The toll charger server 116 may forwards the TUM 216 to the toll pay center 118 corresponding to the vehicle 102. The toll pay center 118 may verify the vehicle 102 account with the customer account system 122 and complete the transaction. The toll pay center 118 may accordingly generates a toll receipt message (TRM) 212 to be returned to the vehicle 102.

In some examples, the vehicle 102 broadcasting the TUM 216 may create a blockchain record of the TUM 216 enforced as a smart contract. The RSU 108 may operate as a transaction database from the TUM 216 information broadcast by the vehicle 102 through exchange of the smart contract. A transaction database at the RSU 108 may update a distributed block chain ledger of received TUMs 216 for tolling enforcement at the RSU 108 and toll gantry 112.

The TRM 212 may include various information determined by the toll pay center 118 in support of completion of the toll transaction performed with the vehicle 102. This information may include a message count (to help in identifying if any packet loss has occurred), the account identifier from the TUM 216, the timestamp the time when the TUM 216 was created, an identifier of the toll charger server 116, and an identifier of the toll pay center 118 (e.g., a GUID). The TRM 212 may also include an intersection identifier of the intersection through which the vehicle 102 entered the roadway 110 (e.g., as indicated in the TUM 216 that was processed by the toll pay center 118), a lane identifier of which lane through which the vehicle 102 entered the roadway 110 (e.g., as indicated in the TUM 216 that was processed by the toll pay center 118), an intersection identifier of the intersection through which the vehicle 102 exited the roadway 110, and a lane identifier of which lane through which the vehicle 102 exited the roadway 110. The TRM 212 may also include the vehicle type and the amount charged for access to the roadway 110.

The toll pay center 118 may forward the TRM 212 to the toll charger server 116. In turn, the toll charger server 116 may forward the TRM 212 back to the RSU 108. The RSU 108 may broadcast the TRM 212, which may be received by the TCU 104 of the vehicle 102. The TCU 104 may update the HMI 114 to display a message indicating completion of the process and the final charged amount.

The STA 202 may receive various elements of data as input. In an example, these inputs may include TAMs 204 (as mentioned above), location information from the GNSS 115 controller, vehicle bus data 206 from a vehicle controller area network (CAN) or other vehicle 102 bus, vehicle assistance 208 information, in-built maps 210 to aid in location of the vehicle 102 along the roadway 110, and TRMs 212 (also as mentioned above).

The STA 202 may provide various outputs as well. In an example, these outputs may include HMI feedback 214 provided to the HMI 114 for use by occupants of the vehicle 102, as well as TUMs 216 for use in charging the vehicle 102 via remote aspects of the tolling system 100 discussed above.

Figure 3:
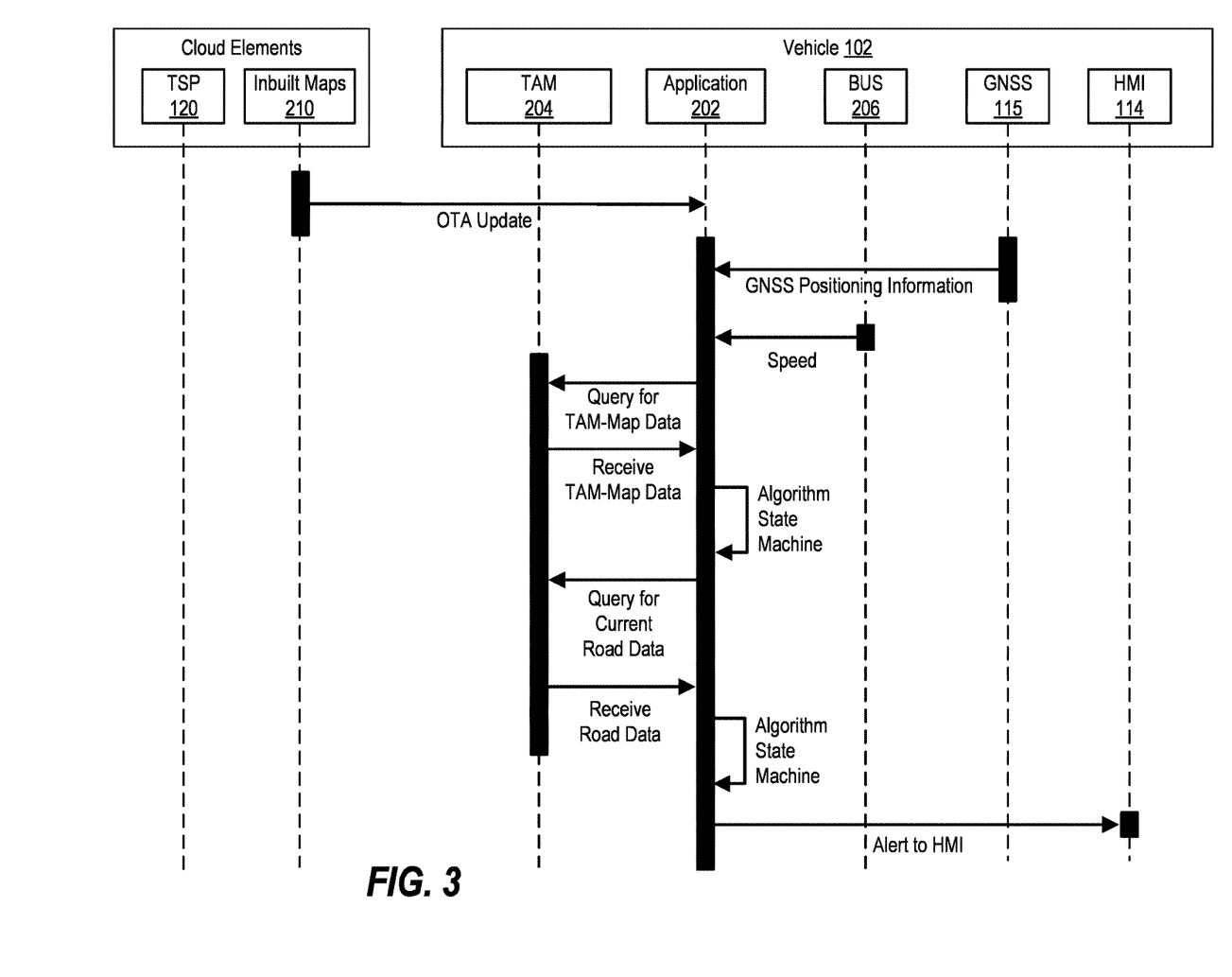
FIG. 3 illustrates an example first portion of a data flow diagram of a first approach to V2X road usage, using vehicle bus data, toll advertisement message (TAM) data, and in-built maps.

To perform the processing of the inputs into the outputs, the STA 202 may include various components. These may include a tolling data aggregator 218 to process the TAMs 204 and TRMs 212, an algorithm classifier 220, a toll region determiner 222 to determine tolling ranges along the roadway 110, a toll lane matcher 224 to match the vehicle 102 to the tolling ranges, a lane straddle algorithm 226 to determine whether the vehicle 102 is straddling across lanes, a position confidence 228 component to handle GNSS offsets sand other confidence factors, a position estimator 230 to estimate the vehicle 102 position, a path estimator 232 to estimate the vehicle 102 path using the vehicle 102 position, an algorithm component 234 to determine the toll amounts based on the TAM 204 and aid in providing the HMI feedback 214, and an algorithm decision 236 component to provide the TUMs 216 and other outputs. A crowdsourcing component 238 may also be used to include FIG. 3 illustrates an example first portion of a data flow diagram of a first approach to V2X road usage, using vehicle bus data 206, TAM 204 data, and in-built maps 210. As shown, an over-the-air (OTA) update may be sent from a cloud computing platform 302 to the STA 202. This update may include updated in-built maps 210, which may define a digital representation of the geography and lanes of the roadways 110 over which the vehicle 102 may travel. While a single update is shown at the outset of the data flow diagram, it should be noted that the timing of the OTA update may vary, and there may be many OTA updates to the in-built maps 210 as updates are made to the in-built maps 210 or as the vehicle 102 travels to new areas.

With respect to continuing operation of the vehicle 102, GNSS positioning information may be received to the STA 202 from the GNSS 115. This information may be indicative of the current location of the vehicle 102 as it travels along the roadways 110 described in the in-built maps 210. Moreover, speed information may additionally be received to the STA 202 via the vehicle bus data 206. This information may be indicative of the current velocity of the vehicle 102 as it travels along the roadways 110.

Based on the current vehicle 102 location and/or velocity, the STA 202 may query the TAM 204 for map data with respect to the current location of the vehicle 102. This information may be indicative of the toll areas, if any, for charging for the vehicle 102 traversing the roadway 110. For instance, the toll areas may be indicated as a geographic anchor point with respect to the in-built maps 210 and may specify a boundary of a cordon or other area in which or through which tolls are to be captured.

The vehicle 102 may receive the TAM 204 in various ways. For instance, the TAM 204 may be received with the in-built maps 210. The map cadence may be, for example, weekly, bi-weekly, or monthly. In another example, the TAM 204 may be received from the RSU 108, e.g., via C-V2X PC5. In such a situation, the TAM 204 may be received as the vehicle 102 traverses the roadway 110, as opposed to with the in-built maps 210. In yet another example, the TAM 204 may be received via toll charger cloud 116.

Based on the information, the STA 202 may utilize a state machine 800 to determine the cost for the tolling. Further aspects of the state machine 800 are illustrated below with respect to FIG. 8. In general, at this point in the data flow, the STA 202 may be updated with the map data to determine the locations of any toll areas for the roadway 110.

As the vehicle 102 traverses the roadway 110, the STA 202 may further query the TAM 204 for data with respect to the current roadway 110 being traversed by the vehicle 102. This may be determined, for instance, by using the GNSS 115 positioning information and/or speed information with respect to the tolling areas defined by the TAM 204. The TAM 204 provide, based on the vehicle 102 location, data indicative of how much a toll is for vehicles 102 according to make, model, class, time of day, number of occupants, distance traveled, etc. This information may be received back to the STA 202.

Responsive to the vehicle 102 entering or being headed into a tolled area, the STA 202 may provide an alert to the user as HMI feedback 214 via the HMI 114. This alert may indicate, for instance, the upcoming toll area, a distance from the toll area, a cost for entering the toll areas, etc.

Figure 4:
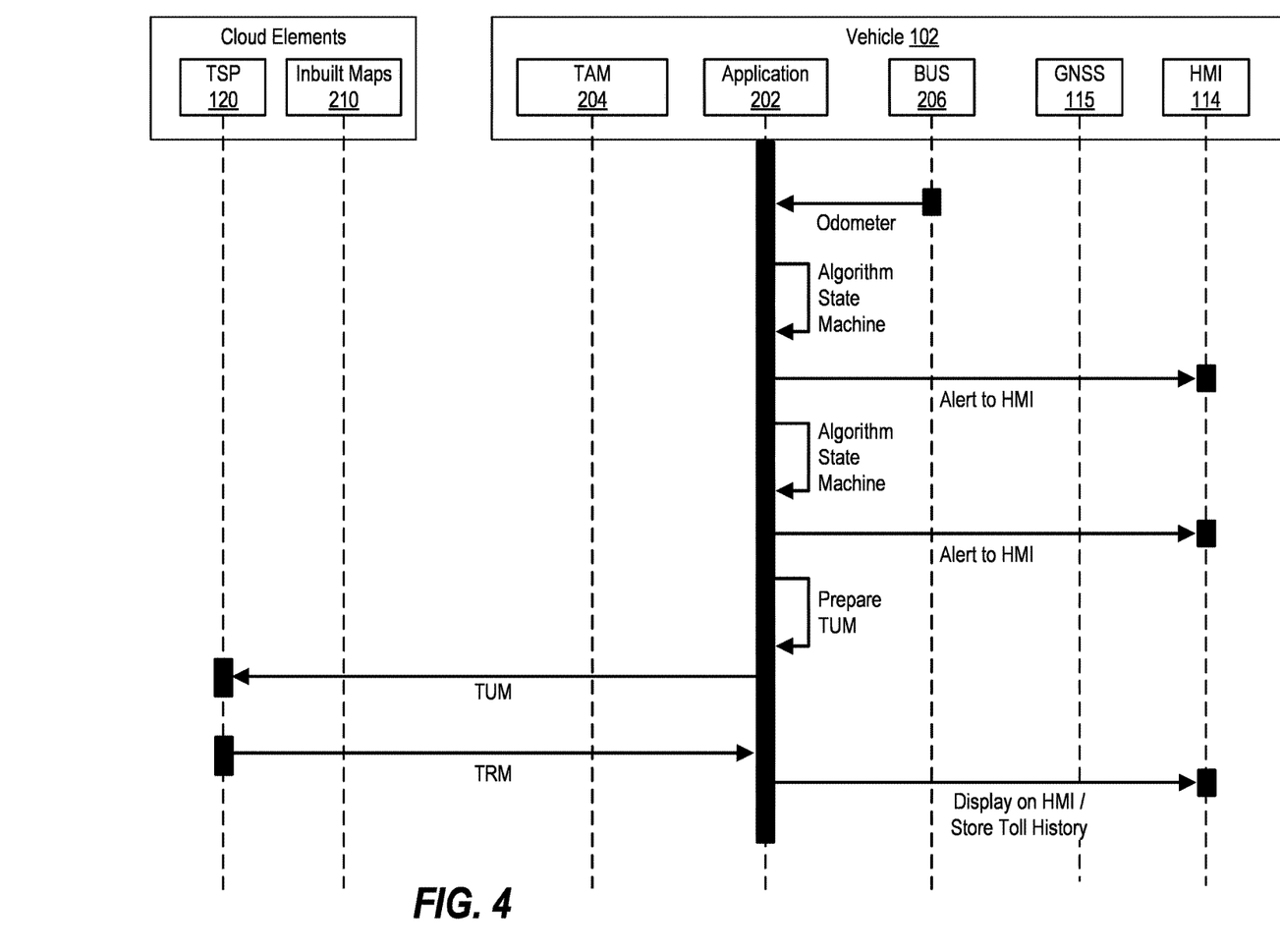
FIG. 4 illustrates an example second portion of the data flow diagram for the first approach to V2X road usage, using vehicle bus data, toll advertisement message data, and in-built maps.

FIG. 4 illustrates an example second portion of the data flow diagram for the first approach to V2X road usage, using vehicle bus data 206, TAM 204 data, and in-built maps 210. Continuing with the data flow from FIG. 3, as shown in FIG. 4 the STA 202 receives odometer information from the vehicle bus data 206. This information may be used by the state machine 800 of the STA 202 to determine the current location and/or distance traveled by the vehicle 102. This information may also be used to update the HMI 114 with HMI feedback 214 with respect to the current toll amount and/or tolling location of the vehicle 102. This processing may continue for one or more iterations.

The smart toll application 202 may also generate a TUM 216 responsive to the vehicle 102 completing the traversal of the toll area. The TUM 216 includes various information provided by the vehicle 102 to the RSU 108 to indicate the usage of the roadway 110 by the vehicle 102 for charging purposes. The TUM 216 may be provided to the toll agency hub 120 for payment processing. In some examples, the TUM 216 may further indicate the cost for the usage as computed by the vehicle 102. This tolling cost information may also be used to update the HMI 114 with HMI feedback 214.

The vehicle 102 may receive a TRM 212 responsive to the processing of the TUM 216. The TRM 212 may include various information determined by the toll pay center 118 in support of completion of the toll transaction performed with the vehicle 102. This information may be received to the STA 202 and stored to a toll history maintained by the vehicle 102. This information may additionally be used to update the HMI 114 with HMI feedback 214 to indicate completion of the charge event with respect to the toll usage of the roadway 110.

Figure 5:
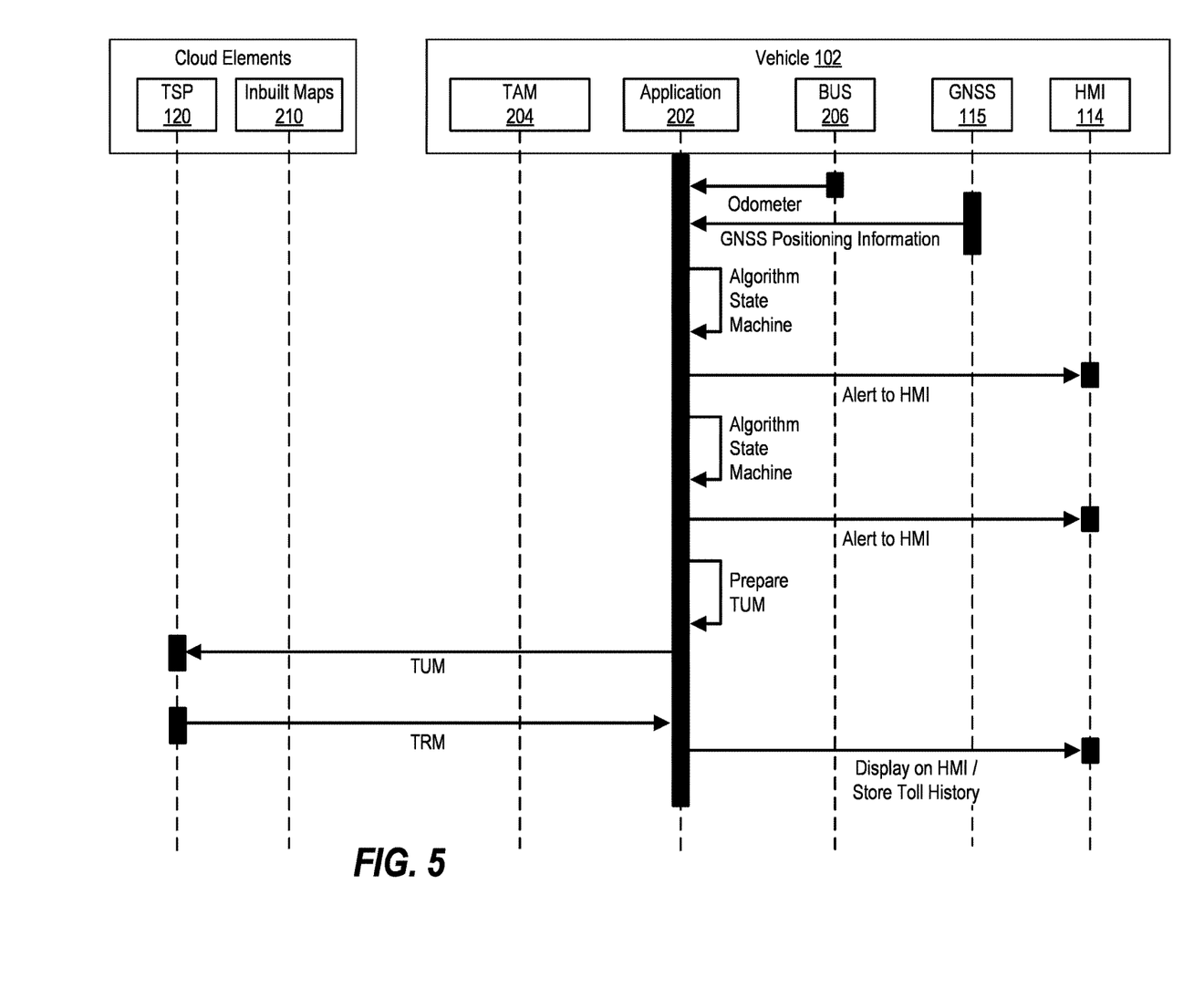
FIG. 5 illustrates an example second portion of the data flow diagram of a second approach to V2X road usage, using vehicle bus data, toll advertisement message data, in-built maps, and global navigation satellite system (GNSS) data.

FIG. 5 illustrates an example second portion of the data flow diagram of a second approach to V2X road usage, using vehicle bus data 206, TAM 204 data, in-built maps 210, and GNSS 115 data. As compared to the example second portion shown in FIG. 4, as illustrated in FIG. 5 the GNSS 115 is further configured to provide GNSS positioning information to the STA 202 for use in determining the current location and/or distance traveled by the vehicle 102. As noted above, this information may also be used to update the HMI 114 with HMI feedback 214 with respect to the current toll amount and/or tolling location of the vehicle 102. By using the GNSS 115 information for tracking the vehicle 102 travel, the STA 202 may be able to compute a more accurate usage measurement as compared to using odometer readings alone.

Figure 6:
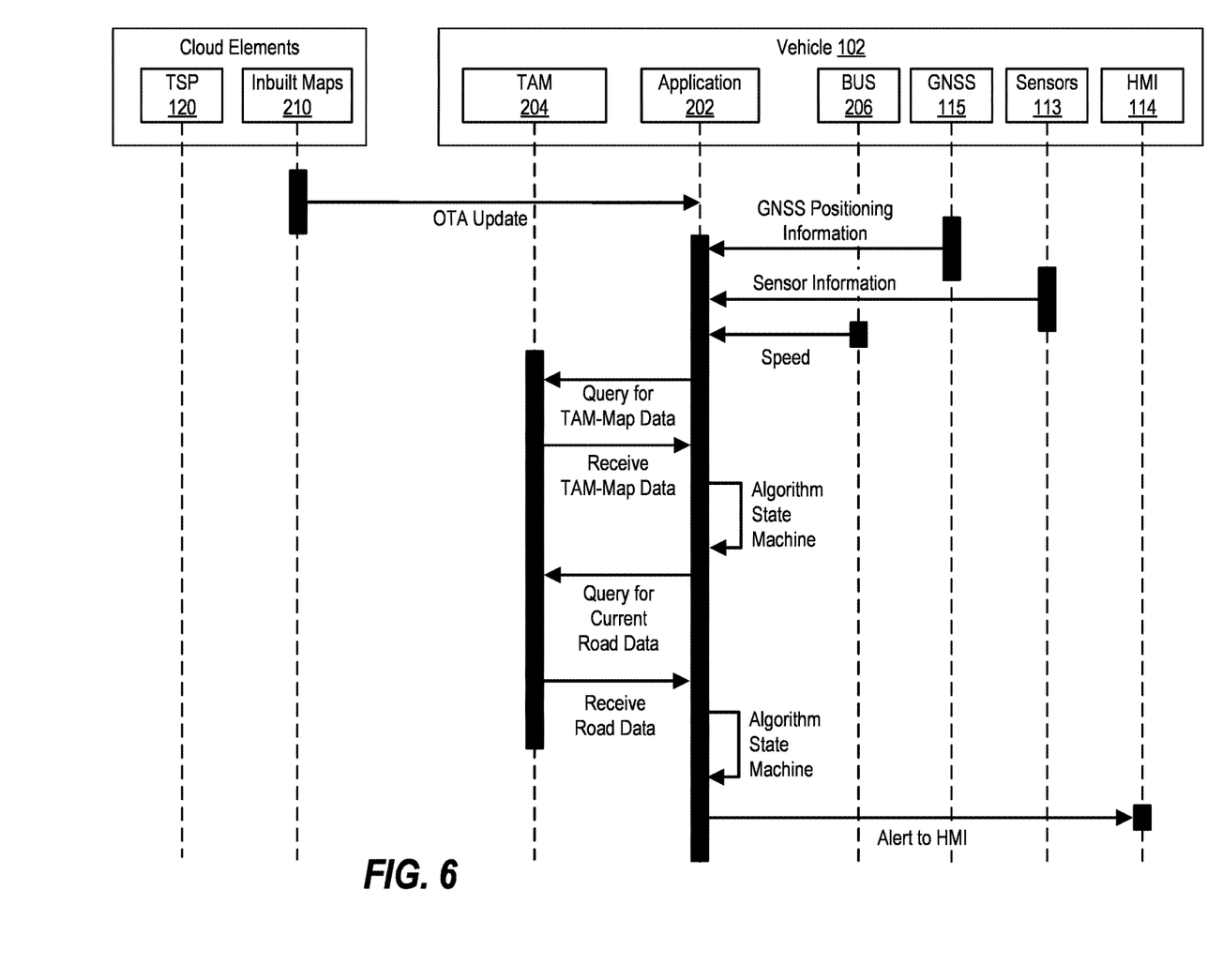
FIG. 6 illustrates an example first portion of the data flow diagram for a third approach to V2X road usage, using vehicle bus data, toll advertisement message data, in-built maps, GNSS data, and vehicle sensor data.
Figure 7:
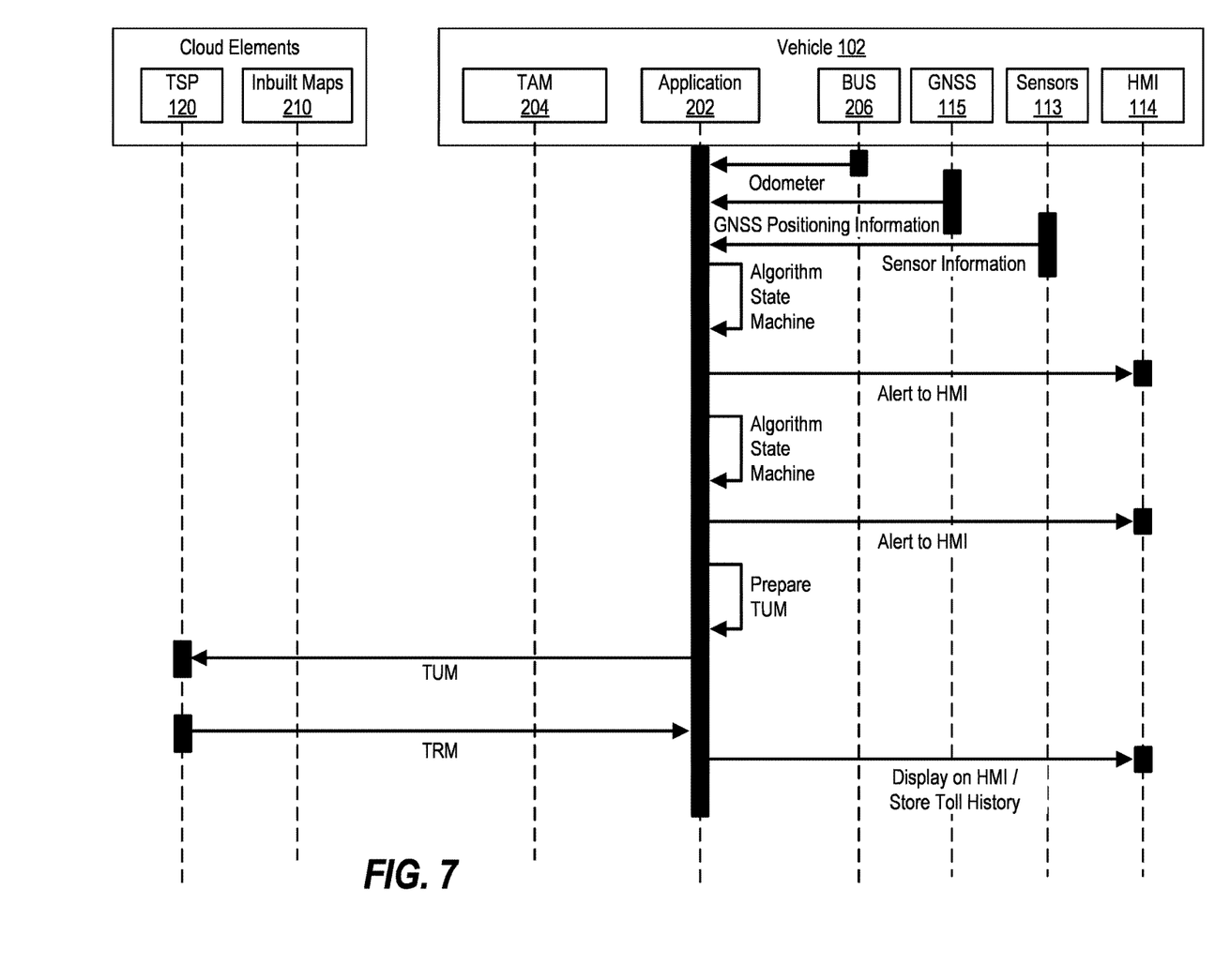
FIG. 7 illustrates an example second portion of the data flow diagram for the third approach to V2X road usage, using vehicle bus data, toll advertisement message data, in-built maps, GNSS data, and vehicle sensor data.

FIG. 6 illustrates an example first portion of the data flow diagram for a third approach to V2X road usage, using vehicle bus data 206, TAM 204 data, in-built maps 210, GNSS 115 data, and vehicle sensor 113 data. FIG. 7 illustrates an example second portion of the data flow diagram for the third approach to V2X road usage, using vehicle bus data 206, TAM 204 data, in-built maps 210, GNSS 115 data, and vehicle sensor 113 data. As compared to the first and second approaches, in this third approach vehicle sensor 113 data is additionally used in the determination of toll areas as well as for vehicle 102 usage. As shown in FIG. 6, sensor information from the vehicle sensors 113 is additionally utilized by the STA 202 to determine the location and/or speed of the vehicle 102 with respect to querying the TAM 204 for map information. As shown in FIG. 7, sensor information from the vehicle sensors 113 is additionally utilized by the STA 202 to determine the location and/or speed of the vehicle 102 with respect to computing the current toll amount and/or tolling location of the vehicle 102.

Figure 8:
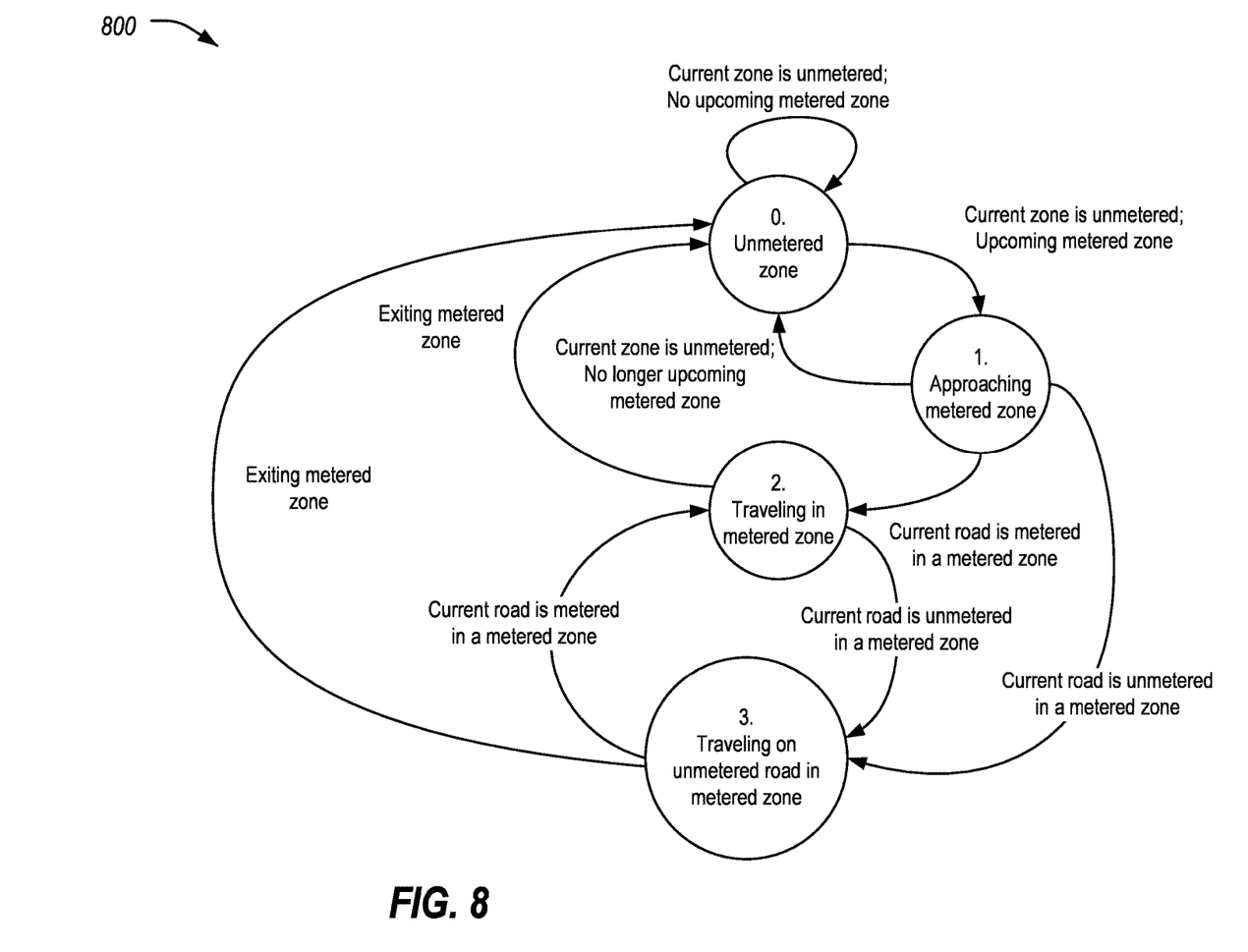
FIG. 8 illustrates an example state machine for the performance of the V2X road usage computations performed by the smart toll application.

FIG. 8 illustrates an example state machine 800 for the performance of the V2X road usage computations performed by the STA 202. In an example, this state machine 800 may be implemented by the instructions of the STA 202 as executed by the TCU 104 of the vehicle 102.

As shown, the state machine 800 includes four main states:

0. Travel of the vehicle 102 in an unmetered zone;

1. Approach of the vehicle 102 to a metered zone;

2. Travel of the vehicle 102 along a metered roadway 110 within the metered zone; and   3. Travel of the vehicle 102 along an unmetered roadway 110 within the metered zone.

In State 0, the vehicle 102 may remain in State 0 responsive to continuing to travel in a zone in which there are no tolls. For instance, this may occur if the vehicle 102 does not receive any TAMs 204. Or, this may occur if the vehicle 102 does receive one or more TAMs 204 but it at least a predefined roadway 110 travel distance away from any toll zones defined by the TAM 204. (E.g., proximity in terms of vehicle 102 travel, as a drive path to get onto the roadway 110 may be required.)

The vehicle 102 may transition from State 0 into State 1 responsive to the vehicle 102 receiving one or more TAMs 204 indicating an upcoming toll zone, and/or responsive to the vehicle 102 moving to within a predefined roadway 110 travel distance from a toll zone defined by the TAM 204. In one example, the vehicle 102 may be traversing a segment of unmetered roadway 110 that connects to a segment of roadway 110 indicated as being metered according to the information in the TAMs 204.

From State 1, the vehicle 102 may transition into State 0 responsive to the vehicle 102 changing paths to move away from the predefined roadway 110 travel distance from any toll zones defined by the TAMs 204. This may occur, for instance, if the vehicle 102 elects not to enter the tolled zone.

The vehicle 102 may transition from State 1 to State 2 responsive to the vehicle 102 crossing over into the toll zone and onto a metered road in the toll zone. In State 2, the vehicle 102 accrues toll charges according to the information specified in the TAM 204. This toll charge may be determined according to factors and charge amounts specified in the TAM 204, such as the make, model, class, time of day, number of occupants, distance traveled, etc. of the vehicle 102.

The vehicle 102 may also transition from State 1 to State 3 responsive to the vehicle 102 crossing over into the toll zone onto an unmetered road within the toll zone. Whether the roadway 110 in the zone is metered or not may be identified by the STA 202, in an example, according to the querying of the map information of the TAM 204. It should also be noted that the vehicle 102 may transition from State 3 to State 2 responsive to the vehicle 102 remaining in the toll zone and entering a metered road in the toll zone, as well as from State 2 to State 3 responsive to the vehicle 102 remaining in the toll zone and entering an unmetered road in the toll zone. From either States 2 or 3, responsive to the vehicle 102 exiting the toll zone the vehicle 102 may transition to State 0. In some examples, the vehicle 102 may send the TUM 216 responsive to transitioning out of the metered zone. Additionally or alternately, the vehicle 102 may send TUMs 216 periodically while in the metered zone to allow the tolling system 100 to keep track of the vehicle 102 usage as the vehicle 102 traverses within the metered zone.

Figure 9:
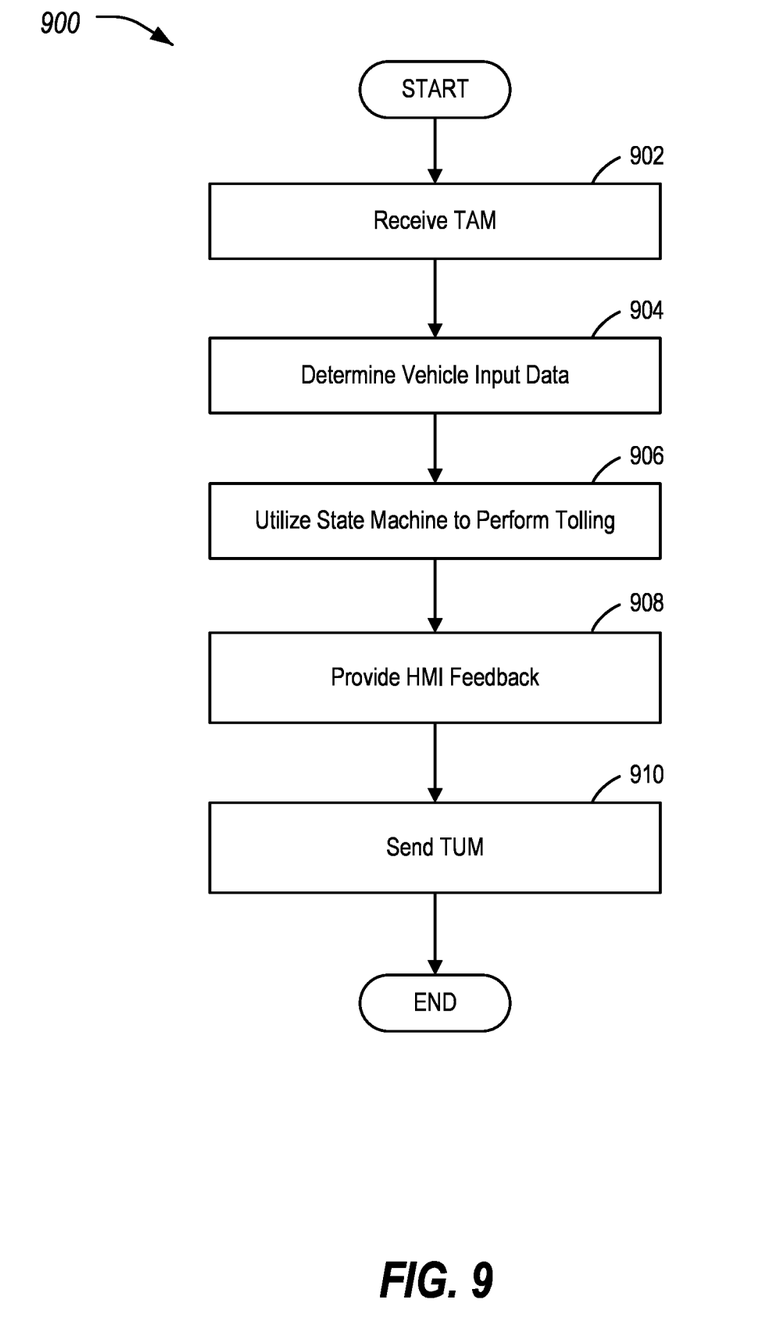
FIG. 9 illustrates an example process for the performance of V2X tolling transactions in accordance with the V2X road usage charging approach.

FIG. 9 illustrates an example process 900 for the performance of V2X tolling transactions in accordance with the V2X road usage charging approach. In an example, the process 900 may be performed by the STA 202 of the vehicle 102 in accordance with the state machine 800.

At operation 902, the STA 202 of the vehicle 102 receives a TAM 204. In an example, the TCU 104 of the vehicle 102 may receive the TAM 204 as broadcast by a RSU 108 along the roadway 110. The TAM 204 may define a metered zone in which tolls are charged. The TAM 204 may also define which segments of the roadway 110 within the metered zone are the metered roadway 110 and which are the unmetered roadway 110. The TAM 204 may also define how much a toll is for vehicles 102 according to make, model, class, time of day, number of occupants, distance traveled, etc.

At operation 904, the STA 202 of the vehicle 102 determines vehicle input data. This data may be received and/or identified from, for example, one or more of vehicle bus data 206, vehicle GNSS 115 data, or vehicle sensor 113 data. The vehicle input data may be used to determine the current position of the vehicle 102.

At operation 906, the STA 202 of the vehicle 102 utilize the state machine 800 to determine tolled roadway 110 usage of the vehicle 102 according to the metered zone and the current position of the vehicle 102. Further aspects of the operation of the state machine 800 are discussed in detail with respect to FIG. 8.

At operation 908, the STA 202 of the vehicle 102 provides HMI feedback. In an example, the STA 202 may provide an alert to the user as HMI feedback 214 via the HMI 114. The alert may indicate, for instance, the upcoming toll area, a distance from the toll area, a cost for entering the toll areas, etc. The HMI feedback 214 may also include information with respect to the current toll amount and/or tolling location of the vehicle 102 and/or an indication of completion of the charge event with respect to the toll usage of the roadway 110.

At operation 910, the STA 202 of the vehicle 102 sends a TUM 216. This TUM 216 may be received by an RSU 108 along the roadway 110. The TUM 216 may also include a charge amount for the travel in the tolled area as determined by the vehicle 102 using the information in the TAM 204. Other information may also be included in the TUM 216, such as the distance traveled by the vehicle 102, a number of passengers in the vehicle 102, and a license plate number or other identifier of the vehicle 102. After operation 910, the process 900 ends.

Figure 10:
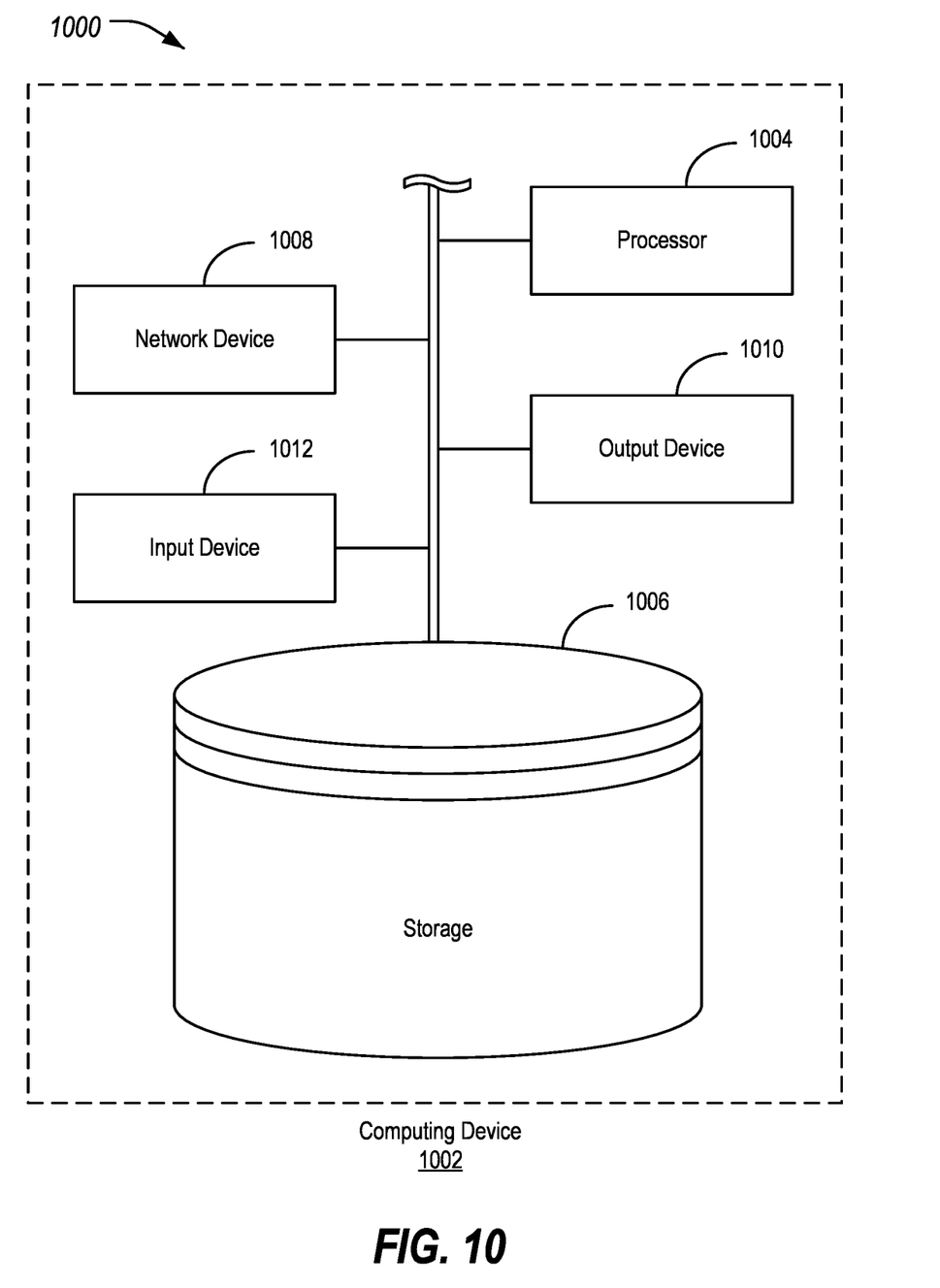
FIG. 10 illustrates an example of a computing device for use in the performance of V2X tolling transactions in accordance with the V2X road usage charging approach.

FIG. 10 illustrates an example 1000 of a computing device 1002 for use in the performance of V2X tolling transactions. Referring to FIG. 10, and with reference to FIGS. 1-9, the TCU 104, RSU 108, toll charger server 116, toll pay center 118, and customer account system 122 may be examples of such computing devices 1002. As shown, the computing device 1002 may include a processor 1004 that is operatively connected to a storage 1006, a network device 1008, an output device 1010, and an input device 1012. It should be noted that this is merely an example, and computing devices 1002 with more, fewer, or different components may be used.

The processor 1004 may include one or more integrated circuits that implement the functionality of a central processing unit (CPU) and/or graphics processing unit (GPU). In some examples, the processors 1004 are a system on a chip (SoC) that integrates the functionality of the CPU and GPU. The SoC may optionally include other components such as, for example, the storage 1006 and the network device 1008 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 1004 executes stored program instructions that are retrieved from the storage 1006. The stored program instructions, accordingly, include software that controls the operation of the processors 1004 to perform the operations described herein. The storage 1006 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally threedimensional (3D) graphics to the output device 1010. The output device 1010 may include a graphical or visual display device, such as an electronic display screen, projector, printer, or any other suitable device that reproduces a graphical display. As another example, the output device 1010 may include an audio device, such as a loudspeaker or headphone. As yet a further example, the output device 1010 may include a tactile device, such as a mechanically raiseable device that may, in an example, be configured to display braille or another physical output that may be touched to provide information to a user.

The input device 1012 may include any of various devices that enable the computing device 1002 to receive control input from users. Examples of suitable input devices that receive human interface inputs may include keyboards, mice, trackballs, touchscreens, voice input devices, graphics tablets, and the like.

The network devices 1008 may each include any of various devices that enable the TCU 104, RSU 108, toll charger server 116, toll pay center 118, tolling system 100, and customer account system 122 to send and/or receive data from external devices over networks (such as the communications network 106). Examples of suitable network devices 1008 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The invention claimed is:

1. A vehicle for smart tolling, comprising:
    a vehicle-to-everything (V2X) transceiver;
    a memory maintaining a smart tolling application implementing a state machine; and
    a processor programmed to execute the smart tolling application to perform operations including to
    receive, via the V2X transceiver, a toll advertisement message defining a metered zone in which tolls are charged,
    determine input data indicative of a current position of the vehicle with respect to the metered zone,
    utilize the state machine to determine tolled roadway usage of the vehicle according to the metered zone and the current position,
    provide, via the V2X transceiver, a toll usage message indicative of the tolled roadway usage, and
    transition from a second state of the state machine in which the vehicle is traveling in the metered zone along a metered roadway to a third state of the state machine in which the vehicle is traveling in the metered zone along an unmetered roadway responsive to the current position being indicative of the vehicle traveling down the unmetered roadway but staying within the metered zone,
    wherein the toll advertisement message is configured to define which segments within the metered zone are the metered roadway and which are the unmetered roadway.

2. The vehicle of claim 1, wherein the processor is further programmed to:
    transition from a zeroth state of the state machine in which the vehicle is not in one of the metered zone to a first state of the state machine in which the vehicle is approaching the metered zone responsive to the current position indicating an approach to the metered zone, and
    transition from the first state of the state machine to the second state of the state machine responsive to the current position indicating vehicle travel along the metered roadway in the metered zone.

3. The vehicle of claim 2, wherein the processor is further programmed to:
    transition from the first state of the state machine to the zeroth state of the state machine responsive to the current position indicating the vehicle travel no longer approaching the metered zone.

4. The vehicle of claim 1, wherein the processor is further programmed to:
    transition from the third state of the state machine to the second state of the state machine responsive to the current position being indicative of the vehicle again traveling down the metered roadway within the metered zone.

5. The vehicle of claim 2, wherein the processor is further programmed to:
    transition from the third state of the state machine or the second state of the state machine to the zeroth state of the state machine responsive to the current position being indicative of the vehicle no longer traveling within the metered zone.

6. The vehicle of claim 1, wherein the input data indicative of the current position includes one or more of vehicle bus data, vehicle global navigation satellite system (GNSS) data, or vehicle sensor data.

7. The vehicle of claim 1, wherein the toll advertisement message is received one or more of:
    from the V2X transceiver in communication with a roadside unit in proximity to the vehicle;
    included with in-built maps defining a digital representation of geography and lanes of the roadway; or
    from a toll charger cloud server.

8. A method for smart tolling, comprising:
    receiving, via a vehicle-to-everything (V2X) transceiver of a vehicle, a toll advertisement message defining a metered zone in which tolls are charged;
    determining input data indicative of a current position of the vehicle with respect to the metered zone;

utilizing a state machine to determine tolled roadway usage of the vehicle according to the metered zone and the current position;

providing, via the V2X transceiver, a toll usage message indicative of the tolled roadway usage; and transitioning from a second state of the state machine in which the vehicle is traveling in the metered zone along a metered roadway of the state machine to a third state of the state machine in which the vehicle is traveling in the metered zone along an unmetered roadway responsive to the current position being indicative of the vehicle traveling down the unmetered roadway but staying within the metered zone, the toll advertisement message defining which segments within the metered zone are the metered roadway and which are the unmetered roadway.

9. The method of claim 8, further comprising:

transitioning from a zeroth state of the state machine in which the vehicle is not in one of the metered zone to a first state of the state machine in which the vehicle is approaching the metered zone responsive to the current position indicating an approach to the metered zone, and transitioning from the first state of the state machine to the second state of the state machine responsive to the current position indicating vehicle travel along the metered roadway in the metered zone.

10. The method of claim 9, further comprising:

transitioning from the first state of the state machine to the zeroth state of the state machine responsive to the current position indicating the vehicle travel no longer approaching the metered zone.

11. The method of claim 9, further comprising:

transitioning from the third state of the state machine or the second state of the state machine to the zeroth state of the state machine responsive to the current position being indicative of the vehicle no longer traveling within the metered zone.

12. A non-transitory computer-readable medium comprising instructions for smart tolling that, when executing by a processor of a vehicle, cause the vehicle to perform operations including to:

receive, via a vehicle-to-everything (V2X) transceiver of a vehicle, a toll advertisement message defining a metered zone in which tolls are charged;

determine input data indicative of a current position of the vehicle with respect to the metered zone;

utilize a state machine to determine tolled roadway usage of the vehicle according to the metered zone and the current position;

provide, via the V2X transceiver, a toll usage message indicative of the tolled roadway usage;

transition from a second state of the state machine in which the vehicle is traveling in the metered zone along a metered roadway to a third state of the state machine in which the vehicle is traveling in the metered zone along an unmetered roadway responsive to the current position being indicative of the vehicle traveling down the unmetered roadway but staying within the metered zone, the toll advertisement message defining which segments within the metered zone are the metered roadway and which are the unmetered roadway.

13. The medium of claim 12, further comprising instructions that, when executed by the processor, cause the processor to perform operations including to:

transition from a zeroth state of the state machine in which the vehicle is not in one of the metered zone to a first state of the state machine in which the vehicle is approaching the metered zone responsive to the current position indicating an approach to the metered zone;

transition from the first state of the state machine to the second state of the state machine responsive to the current position being indicative of vehicle travel along the metered roadway in the metered zone;

transition from the first state of the state machine to the zeroth state of the state machine responsive to the current position indicating the vehicle travel no longer approaching the metered zone;

transition from the third state of the state machine to the second state of the state machine responsive to the current position being indicative of the vehicle travel again traveling down the metered roadway within the metered zone; and transition from the third state of the state machine or the second state of the state machine to the zeroth state of the state machine responsive to the current position being indicative of the vehicle no longer traveling within the metered zone.

\* \* \* \* \*